United States Patent
St. Pierre

[15] 3,659,260
[45] Apr. 25, 1972

[54] VEHICLE WARNING LIGHT DEVICE

[72] Inventor: Joseph A. St. Pierre, Hazelnut Hill, Groton, Conn. 06340

[22] Filed: Sept. 30, 1970

[21] Appl. No.: 76,736

[52] U.S. Cl. .................................................340/71, 200/34
[51] Int. Cl. ...........................................................B60q 1/50
[58] Field of Search ..................................................340/71

[56] References Cited

UNITED STATES PATENTS 2,219,351  10/1940  Worrall...................................340/71
3,359,540  12/1967  Dunavan................................340/72

Primary Examiner—John W. Caldwell
Assistant Examiner—Kenneth N. Leimer

[57] ABSTRACT

A vehicle warning light device in which the accelerator pedal is coupled through a fork and roller linkage to a dashpot controlled switch to light an amber warning light for a period of time following sudden release of the accelerator pedal.

1 Claims, 2 Drawing Figures

PATENTED APR 25 1972 3,659,260

INVENTOR.
JOSEPH A. ST. PIERRE

VEHICLE WARNING LIGHT DEVICE

This invention relates to a vehicle signal lights, and more particularly to a vehicle warning light device.

It is therefore the primary purpose of this invention to provide a warning light device which will function to warn a following motorist that the vehicle ahead will slow down or stop, the warning lights being yellow or amber color.

Another object of this invention is to provide a warning light device which will be composed of link rods with spring and contact means that will close the circuit to the amber lights of the vehicle when the driver releases his foot from the accelerator pedal and by air cylinder means after a given period of time, the circuit to the amber lights will open.

A further object of this invention is to provide a device of the type described which will give the following motorist added time to realize that the vehicle ahead may stop, even before the driver of the vehicle ahead applies his brakes which will light the red rear lights of the vehicle.

Other objects of the present invention are to provide a vehicle warning light device which is simple in design, inexpensive to manufacture, rugged in construction, easy to use and efficient in operation.

These and other objects will be readily evident upon a study of the following specification and the accompanying drawing wherein.

Figure 1:
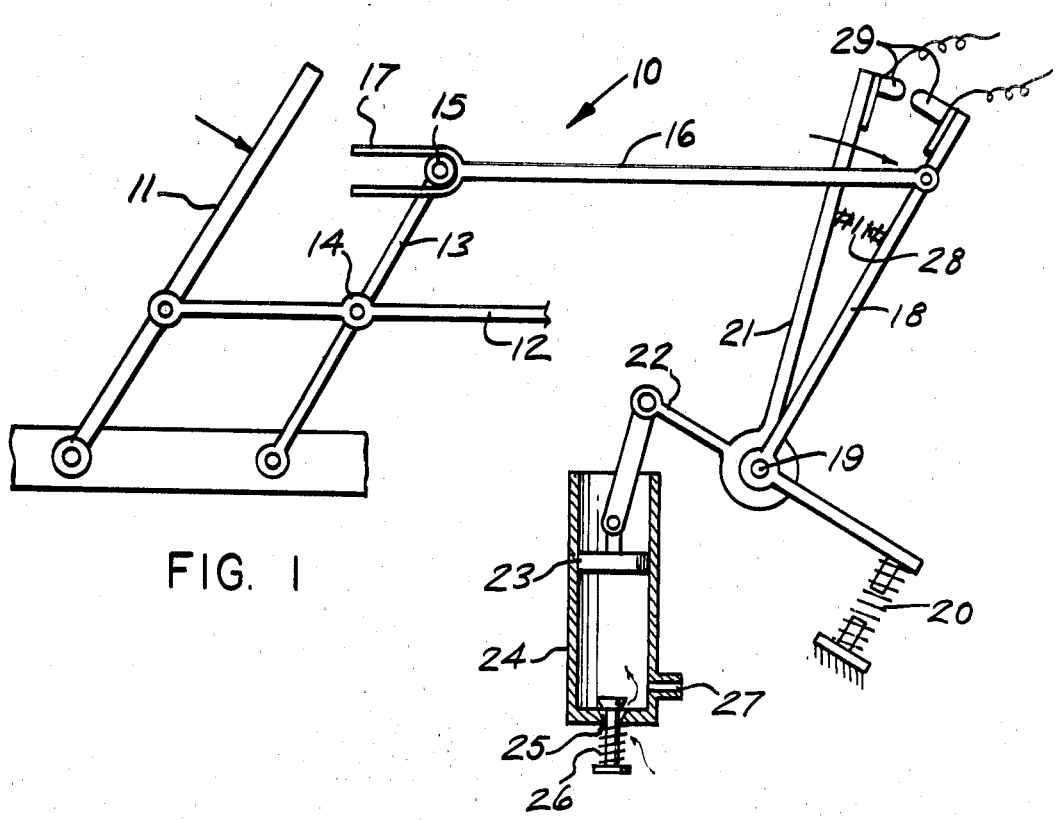
FIG. 1 is a side view of the mechanism when the accelerator pedal is depressed.
Figure 2:
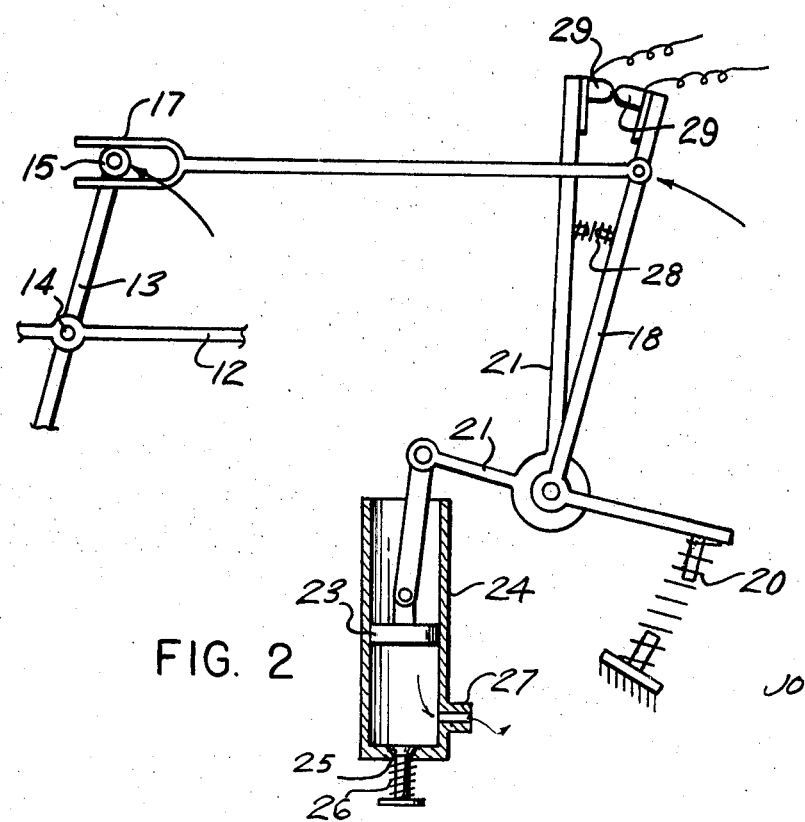
FIG. 2 is a similar view thereof after the accelerator pedal is released.

According to this invention, device 10 shows the accelerator pedal 11 connected to the throttle (not shown) by means of link rod 12. An arm 13 is pivotally connected to link rod 12 and is pivoted at one end on a fixed portion of the vehicle, the free end of rod 13 including a roller 15 which is engaged by the arm 16 within the fork portion 17.

The opposite end of arm 16 is pivotally connected to arm 18 pivotable at point 19 and biased counter-clockwise by a spring 20.

Also pivoted at point 19 is an arm 21 having a bellcrank 22 connected to piston 23 of a hollow cylinder 24. Cylinder 24 includes an air intake port 25 which is closed by a valve lightly biased by a spring 26 and cylinder 24 also includes a narrow air escape port 27 for a purpose which hereinafter will be described.

Arms 18 and 21 are provided with a separating lightweight spring 28 and electrical contacts 29 which lead to a conventional circuit (not shown), containing amber lights, the vehicle battery and a fuse, all in a series hook-up.

When the vehicle is accelerating, air freely enters the intake port 25 which will cause the acceleration of the vehicle not to be impeded regardless of the rate at which the accelerator pedal is depressed.

When the vehicle is decelerating, pedal 11 moves backwards freely as the roller 15 moves in fork portion 17 of the arm 16.

As a result, the arm 16 follows slowly because of the narrow air port 27 restraining the arm 16 by means of the piston 23, arm 21, and spring 28. By spring 28 being lightweight, the contacts 29 will close thus closing the circuit of the amber warning lights.

When spring 20 reaches its limiting position, the electrical contacts 29 will then open and remain open so as not to interfere with the brake light signals when actuated by the driver of the vehicle.

What I claim is:

1. A vehicle warning light device, comprising in combination, a link rod connected at one end to a pivotable portion of an accelerator pedal of an automotive vehicle, said link rod being attached pivotally free to an intermediate portion of a rod pivotable at its one end about a pin stationarily secured to said vehicle, an opposite end of said rod being provided with a roller carried slideably free within a fork of a first arm which at its opposite end is connected pivotally free to an intermediate portion of a contact arm pivotable about its one end, the opposite end of said contact arm being provided with an electrical contact engageable with a contact on a second contact arm that is likewise pivotable about a fulcrum pin stationarily mounted upon said vehicle and about which the first contact arm is pivotable, said second contact arm being integral with a bellcrank connected to one end of a piston rod which at its opposite end is connected to a piston slidable within a pneumatic cylinder, said cylinder at its one end being provided with an air intake port and an air escape port, and the first said contact arm being integral with a foot urged by a compression spring so that said fork follows said roller, said contact arms being normally urged apart by means of a light compression spring therebetween.

* * * * *